(12) United States Patent
Nakajima et al.

(10) Patent No.: US 12,460,056 B2
(45) Date of Patent: Nov. 4, 2025

(54) ETHYLENE-VINYL ALCOHOL COPOLYMER RESIN COMPOSITION, FILM, AND MULTILAYER STRUCTURE

(71) Applicant: Mitsubishi Chemical Corporation, Tokyo (JP)

(72) Inventors: Takuya Nakajima, Tokyo (JP); Yoshihiro Nakai, Tokyo (JP); Keisuke Takeshita, Tokyo (JP); Kenji Kudo, Tokyo (JP); Tomoyuki Yamamoto, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 823 days.

(21) Appl. No.: 17/570,444

(22) Filed: Jan. 7, 2022

(65) Prior Publication Data

US 2022/0127398 A1   Apr. 28, 2022

Related U.S. Application Data

(63) Continuation of application No. PCT/JP2020/030358, filed on Aug. 7, 2020.

(30) Foreign Application Priority Data

Aug. 9, 2019  (JP) ................. 2019-147753
Aug. 9, 2019  (JP) ................. 2019-147756
Nov. 29, 2019 (JP) ................. 2019-216941

(51) Int. Cl.
| C08J 5/18 | (2006.01) |
| C08F 216/06 | (2006.01) |
| C08K 5/098 | (2006.01) |
| C08K 5/56 | (2006.01) |
| C08L 23/0861 | (2025.01) |
| C08L 29/04 | (2006.01) |

(52) U.S. Cl.
CPC .............. *C08J 5/18* (2013.01); *C08F 216/06* (2013.01); *C08K 5/098* (2013.01); *C08K 5/56* (2013.01); *C08L 23/0861* (2013.01); *C08L 29/04* (2013.01); *C08F 2800/10* (2013.01); *C08J 2329/04* (2013.01); *C08J 2329/06* (2013.01)

(58) Field of Classification Search
CPC ...... C08J 5/18; C08J 2329/04; C08J 2329/06; C08F 216/06; C08F 2800/10; C08K 5/098; C08K 5/56; C08L 23/0861; C08L 29/04

See application file for complete search history.

(56) References Cited

U.S. PATENT DOCUMENTS 5,349,046 A    9/1994 Beshouri et al.
10,570,266 B2 * 2/2020 Yoshida ............. C08J 3/2056
2004/0091653 A1   5/2004 Tai et al.
2012/0128961 A1   5/2012 Yoshida et al.
2016/0017092 A1 * 1/2016 Iwamoto ........... C08G 63/916
2017/0253721 A1   9/2017 Yoshida
2018/0015707 A1 * 1/2018 Kani ................. B32B 27/34
2019/0256700 A1   8/2019 Hashimoto et al.
2020/0172712 A1   6/2020 Komuro

FOREIGN PATENT DOCUMENTS

| CN | 102482474 A | 5/2012 |
| CN | 107000259 A | 8/2017 |
| CN | 109952345 A | 6/2019 |
| EP | 2474571 | 7/2012 |
| EP | 3228431 | 10/2017 |
| JP | 2001-277341 A | 10/2001 |
| JP | 2003-301055 | 10/2003 |
| JP | 2004-091521 | 3/2004 |
| JP | 2004-323787 A | 11/2004 |
| JP | 2012-087215 A | 5/2012 |
| JP | 2017-088666 | 5/2017 |
| JP | 2019-007004 A | 1/2019 |
| JP | 2020-164865 A | 10/2020 |
| TW | 201922899 A | 6/2019 |
| WO | 2016/088862 | 6/2016 |
| WO | 2018/088347 A1 | 5/2018 |
| WO | 2019/083000 A1 | 5/2019 |

OTHER PUBLICATIONS

Morioka (Year: 1998).*
Ivanov (Year: 2017).*
Office Action issued in CN Patent Application No. 202080049412.8, Jan. 20, 2024, translation.
Evidence Document: Tian et al. "Study on the preparation, characterization and fluorescence properties of 1.0G-Zn($C_6H_5$COOH)-HDS", Aug. 2016, cited in CN Office Action dated Jan. 20, 2024, translation.
Evidence Document: Zhang et al., "The Preparation and the Nonlinear Optical Properties of $Cd_xZn_{1-x}$O Thin Films", included in CN Office Action dated Jan. 20, 2024, translation of abstract.
Evidence Document: Tian et al. "Synthesis, Characterization and Fluorescence of 1.0G-Zn($C_6H_5$COOH)-HDS", included in CN Office Action dated Jan. 20, 2024, translation of abstract.
Notice of Allowance issued in U.S. Appl. No. 17/588,697, filed Sep. 9, 2024.
Office Action issued in CN Patent Application No. 202080049412.8, Sep. 2, 2023, translation.

(Continued)

Primary Examiner — John M Cooney
Assistant Examiner — Elizabeth Amato
(74) Attorney, Agent, or Firm — GREENBLUM & BERNSTEIN P.L.C.

(57) ABSTRACT

An ethylene-vinyl alcohol copolymer resin composition containing an ethylene-vinyl alcohol copolymer and a metal compound satisfying the following general formula (1), as an ethylene-vinyl alcohol copolymer resin composition having an excellent gas barrier property in the high humidity environment, particularly an excellent oxygen barrier property in the high humidity environment:

$$M_a(OH)_b A^{n-}{}_{(2a-b)/n} \quad (1)$$

wherein M is a metal species, A is an anionic ligand having a valence of n− and excluding a hydroxy ligand and O (oxo ligand), n is an integer not less than 1, and a and b are each a number greater than zero and satisfy an expression a/b=0.1 to 10.

6 Claims, No Drawings

(56) References Cited

OTHER PUBLICATIONS

IPRP issued in International Pat. Appl. No. PCT/JP2020/030358, Feb. 8, 2022, translation.
Office Action issued in CN Patent Application No. 202080049412.8, May 22, 2024, translation.
Evidence Document: Ono et al. "Solid Alkaline Catalyst (1st Edition)", 2013, p. 128, cited and discussed in CN Office Action translation dated May 22, 2024.
Evidence Document: Liu Zhihong et al., Hui Edition of Cases for Identifying the Attributes of Imported Solid Waste (First Edition), 2015, p. 35, cited and discussed in CN Office Action translation dated May 22, 2024.
Office Action issued in JP Patent Application No. 2021-539266, mailed May 7, 2024, translation.
Office Action issued in JP Patent Application No. 2021-539267, mailed May 7, 2024, translation.
ISR issued in International Patent Application No. PCT/JP2020/030359, Oct. 20, 2020, translation.
IPRP issued in International Patent Application No. PCT/JP2020/030359, Feb. 8, 2022, translation.
Search report issued in European Patent Application No. 20853302.6, Aug. 4, 2022.
Office Action issued in CN Patent Application No. 202080053943.4, Feb. 8, 2023, translation.
Office Action issued in TW Patent Application No. 109126811, Oct. 26, 2023, translation.
Office Action issued in U.S. Appl. No. 17/588,697, Feb. 29, 2024.
Notice of Allowance issued in U.S. Appl. No. 17/588,697, Jul. 24, 2024.
Office Action issued in CN Patent Application No. 202080049412.8, dated Jan. 18, 2023, translation.
International Search Report issued in International Pat. Appl. No. PCT/JP2020/030358, dated Oct. 20, 2020, along with an English translation thereof.
International Preliminary Report on Patentability issued in International Pat. Appl. No. PCT/JP2020/030358, dated Oct. 20, 2020, along with an English translation thereof.
Supplemental European Search Report issued in European Application No. 20851705.2, dated Aug. 26, 2022.
Office Action issued in EP Patent Application No. 20851705.2, Dec. 20, 2024.
Office Action issued in European Patent Application No. 20853302.6, issued Oct. 16, 2024.

\* cited by examiner

ETHYLENE-VINYL ALCOHOL COPOLYMER RESIN COMPOSITION, FILM, AND MULTILAYER STRUCTURE

RELATED APPLICATION

This application is a continuation of International Application No. PCT/JP2020/030358, filed on Aug. 7, 2020, which claims priority to Japanese Patent Application Nos. 2019-147753 and 2019-147756, filed on Aug. 9, 2019, and Japanese Patent Application No. 2019-216941, filed on Nov. 29, 2019, the entire contents of each of which being herein incorporated by reference.

TECHNICAL FIELD

The present disclosure relates to an ethylene-vinyl alcohol copolymer resin composition and, more particularly, to an ethylene-vinyl alcohol copolymer resin composition which can be used for formation of a film having a higher gas barrier property in the high humidity environment.

BACKGROUND ART

Ethylene-vinyl alcohol copolymers are excellent in transparency, a gas barrier property against oxygen and the like, aroma retention, solvent resistance, oil resistance, mechanical strength and the like, and are molded into films, sheets, bottles and the like, and are widely used as various packaging materials such as food packaging materials, pharmaceutical packaging materials, industrial chemical packaging materials, agricultural chemical packaging materials and the like.

However, since the ethylene-vinyl alcohol copolymer has a relatively active hydroxyl group in the molecule, it is greatly affected by humidity, and its gas barrier property is remarkably lowered in the high humidity environment.

As an ethylene-vinyl alcohol copolymer film having an enhanced gas barrier property of an ethylene-vinyl alcohol copolymer, PTL 1 discloses an ethylene-vinyl alcohol copolymer film obtained by uniformly dispersing an inorganic compound in an ethylene-vinyl alcohol copolymer.

Further, PTL 2 discloses an ultraviolet shielding film having excellent transparency obtained by adequately dispersing zinc oxide ultrafine particles in an ethylene-vinyl alcohol copolymer.

RELATED ART DOCUMENTS

Patent Documents

PTL 1: International Publication WO2016/088862
PTL 2: JP-A-2004-91521

SUMMARY

However, in the film disclosed in PTL 1 above, a gas barrier property is improved by dispersing an inorganic compound in an ethylene-vinyl alcohol copolymer, but the gas barrier property in the high humidity environment is not sufficient, and a further improvement is required.

Further, although PTL 2 provides a film containing zinc oxide ultrafine particles in an ethylene-vinyl alcohol copolymer, it is not an issue to improve a gas barrier property in the high humidity environment, and therefore, the gas barrier property in the high humidity environment is insufficient, and a further improvement is required.

Therefore, the present disclosure under such a background provides an ethylene-vinyl alcohol copolymer resin composition excellent in a gas barrier property in the high humidity environment, particularly excellent in an oxygen barrier property in the high humidity environment.

Then, the inventors of the present disclosure have found that an ethylene-vinyl alcohol copolymer resin composition containing a specific metal compound is excellent in a gas barrier property in the high humidity environment.

That is, according to a first aspect of the present disclosure, an ethylene-vinyl alcohol copolymer resin composition is provided, which comprises an ethylene-vinyl alcohol copolymer and a metal compound in which the metal compound satisfies the following general formula (1):

$$M_a(OH)_b A^{n-}{}_{(2a-b)/n} \qquad (1)$$

(wherein M is a metal species, A is an anionic ligand having a valence of n− and excluding a hydroxy ligand and O (oxo ligand), n is an integer not less than 1, and a and b are each a number greater than zero and satisfy an expression a/b=0.1 to 10.).

According to a second aspect of the present disclosure, a film is provided, which comprises the ethylene-vinyl alcohol copolymer resin composition according to the first aspect. According to a third aspect of the present disclosure, a multilayer structure is provided, which includes at least one layer comprising the film according to the second aspect.

The ethylene-vinyl alcohol copolymer resin composition of the present disclosure contains an ethylene-vinyl alcohol copolymer and a metal compound satisfying the general formula (1) described above. Where molecules of the ethylene-vinyl alcohol copolymer and water molecules are present around the metal compound satisfying the above general formula (1), layers of the metal compound are separated from each other to form a minute lamellar structural unit, which interacts with the ethylene-vinyl alcohol copolymer in a molecular level. As a result, the film comprising the ethylene-vinyl alcohol copolymer resin composition is excellent in gas barrier property, particularly in oxygen barrier property, in the high humidity environment.

When the metal compound is present in an amount of 0.01 to 10 parts by weight on a metal basis based on 100 parts by weight of the ethylene-vinyl alcohol copolymer, a gas barrier property, particularly an oxygen barrier property in the high humidity environment can be more excellent when formed into a film.

The film containing the ethylene-vinyl alcohol copolymer resin composition of the present disclosure can be excellent in a gas barrier property, particularly an oxygen barrier property in the high humidity environment.

When the film has an oxygen permeability of not greater than 15 cc·20 μm/m²·day·atm at 20° C. at 90% RH, a gas barrier property, particularly an oxygen barrier property in the high humidity environment can be more excellent.

The multilayer structure having at least one layer formed of the film can be excellent in a gas barrier property, particularly an oxygen barrier property in the high humidity environment.

DESCRIPTION OF EMBODIMENTS

Hereinafter, embodiments for carrying out the present disclosure will be specifically described, but the present disclosure is not limited thereto.

Further, in the present disclosure, "the ethylene-vinyl alcohol copolymer" is referred to as "EVOH" in some cases.

The EVOH resin composition of the present disclosure contains EVOH and a metal compound which satisfies the following general formula (1):

$$M_a(OH)_b A^{n-}{}_{(2a-b)/n} \qquad (1)$$

(wherein M is a metal species, A is an anionic ligand having a valence of n– and excluding a hydroxy ligand and O (oxo ligand), n is an integer not less than 1, and a and b are numbers greater than zero and satisfy an expression a/b=0.1 to 10.).

Hereinafter, each constituent component will be described.

[EVOH]

The EVOH is usually a resin obtained by saponifying an ethylene-vinyl ester-based copolymer, which is a copolymer of ethylene and a vinyl ester-based monomer, and is a water-insoluble thermoplastic resin. As the vinyl ester-based monomer, vinyl acetate is generally used from the economical point of view.

The polymerization method of ethylene and a vinyl ester-based monomer can be carried out by using any known polymerization methods, for example, solution polymerization, suspension polymerization, and emulsion polymerization, and generally, solution polymerization using methanol as a solvent is used. Saponification of the resultant ethylene-vinyl ester-based copolymer can also be carried out in a known manner.

The EVOH produced in this manner is mainly composed of an ethylene-derived structural unit and a vinyl alcohol structural unit, and usually contains a small amount of a vinyl ester structural unit that remains without saponification.

As the vinyl ester-based monomer, vinyl acetate is typically used because of its good marketability and high efficiency of impurity treatment during production. Examples of other vinyl ester-based monomers include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, vinyl versatate and the like, and aromatic vinyl esters such as vinyl benzoate and the like, and usually, aliphatic vinyl esters having 3 to 20 carbon atoms, preferably 4 to 10 carbon atoms, and particularly preferably 4 to 7 carbon atoms can be used. These can be used alone or in combination.

The content of the ethylene structural unit in EVOH can be controlled by the pressure of ethylene at the time of copolymerizing a vinyl ester-based monomer and ethylene, and is usually 20 to 60 mol %, preferably 25 to 50 mol %, particularly preferably 25 to 35 mol %. If the content is too low, the gas barrier property and melt moldability in the high humidity environment tend to lower, while if the content is too high, the gas barrier property tends to lower.

The content of the ethylene structural unit can be measured based on ISO14663.

Further, the degree of saponification of the vinyl ester component in EVOH can be controlled by the amount of a saponification catalyst (usually, an alkaline catalyst such as sodium hydroxide or the like is used), temperature, time and the like when saponifying the ethylene-vinyl ester copolymer, and is usually 90 to 100 mol %, preferably 95 to 100 mol %, particularly preferably 99 to 100 mol %. If the saponification degree is too low, the gas barrier property, thermal stability, moisture resistance and the like tend to deteriorate.

The degree of saponification of EVOH can be measured based on JIS K6726 (where, EVOH is used as a solution uniformly dissolved in a water/methanol solvent).

The melt flow rate (MFR) (210° C., load 2160 g) of EVOH is usually 0.5 to 100 g/10 minutes, preferably 1 to 50 g/10 minutes, particularly preferably 3 to 35 g/10 minutes. If the MFR is too large, the film-forming property tends to be unstable, and if it is too small, the viscosity tends to be too high and melt extrusion tends to become difficult.

Such MFR is intended as an index of the degree of polymerization of EVOH, and can be adjusted by the amount of a polymerization initiator upon copolymerization of ethylene and a vinyl ester-based monomer, and the amount of the solvent.

In addition, structural units derived from comonomers shown below may be further contained in EVOH, as long as the effects of the present disclosure are not impaired (for example, not higher than 10 mol % of EVOH).

Examples of the comonomer include olefins such as propylene, 1-butene, isobutene and the like; hydroxy group-containing α-olefins such as 3-butene-1-ol, 3-butene-1,2-diol, 4-penten-1-ol, 5-hexene-1,2-diol and the like, and derivatives thereof such as esterified products, acylated products and the like; hydroxyalkyl vinylidenes such as 2-methylenepropane-1,3-diol, 3-methylenepentane-1,5-diol and the like; hydroxyalkyl vinylidene diacetates such as 1,3-diacetoxy-2-methylenepropane, 1,3-dipropionyloxy-2-methylenepropane, 1,3-dibutyryloxy-2-methylenepropane and the like; unsaturated acids such as acrylic acid, methacrylic acids, crotonic acid, (anhydrous) phthalic acid, (anhydrous) maleic acid, (anhydrous) itaconic acid and the like or salts thereof or mono- or dialkyl esters having 1 to 18 carbon atoms in the alkyl group; acrylamides such as acrylamide, N-alkylacrylamides having 1 to 18 carbon atoms in the alkyl group, N,N-dimethylacrylamide, 2-acrylamide propane sulfonic acid or salts thereof, acrylamide propyl dimethylamine or salts or quaternary salts thereof and the like; methacrylamides such as metacrylamide, N-alkylmethacrylamides having 1 to 18 carbon atoms in the alkyl group, N,N-dimethylmethacrylamide, 2-methacrylamide propanesulfonic acid or salts thereof, methacrylamidepropyldimethylamine or salts or quaternary salts thereof and the like; N-vinylamides such as N-vinylpyrrolidone, N-vinylformamide, N-vinylacetamide and the like; vinyl cyanides such as acrylonitrile, methacrylonitrile and the like; vinyl ethers such as alkylvinyl ethers having 1 to 18 carbon atoms in the alkyl group, hydroxyalkyl vinyl ethers, alkoxyalkyl vinyl ethers and the like; halogenated vinyl compounds such as vinyl chloride, vinylidene chloride, vinyl fluoride, vinylidene fluoride, vinyl bromide and the like; vinyl silanes such as trimethoxy vinyl silane and the like; halogenated allyl compounds such as allyl acetate, allyl chloride and the like; allyl alcohols such as allyl alcohol, dimethoxy allyl alcohol and the like; and comonomers such as trimethyl-(3-acrylamide-3-dimethylpropyl)-ammonium chloride, acrylamide-2-methylpropane sulfonic acid and the like. These can be used alone or in combination.

In particular, EVOH having a primary hydroxyl group in the side chain is preferable in that the secondary moldability is improved while maintaining the gas barrier property, and among them, EVOH obtained by copolymerizing a hydroxy group-containing α-olefin is preferable, and particularly, EVOH having a 1,2-diol structure in the side chain is preferred.

In particular, in the case of EVOH having a primary hydroxyl group in the side chain, the content of the structural unit derived from the monomer having a primary hydroxyl group is usually 0.1 to 20 mol %, further 0.5 to 15 mol %, particular preferably 1 to 10 mol % of EVOH.

Further, the EVOH used in the present disclosure may be subjected to "post-modification" such as urethanization, acetalization, cyanoethylation, oxyalkylenization, acylation and the like.

Furthermore, EVOH for use in the present disclosure may be a mixture with other different EVOH, and such other EVOHs include those having different degrees of saponification, those having different degrees of polymerization, those having different copolymerization components, and the like.

The EVOH is preferably the main component of the EVOH resin composition, and the content of EVOH with respect to the whole EVOH resin composition is usually not less than 80 wt. %, preferably not less than 90 wt. %, particularly preferably not less than 95 wt. %. The upper limit thereof is usually 99.99 wt. %.

[Metal Compound]

The metal compound used in the present disclosure has a lamellar structure including layers of a specific structural until spaced at a specific interfacial distance from each other.

The structural unit contains a metal, a hydroxy ligand, and an anionic ligand other than a hydroxyl ligand, and is represented by the following chemical formula (1).

$$M_a(OH)_b A^{n-}{}_{(2a-b)/n} \qquad (1)$$

(wherein M is a metal species, A is an anionic ligand having a valence of n– and excluding a hydroxy ligand and O (oxo ligand), n is an integer not less than 1, and a and b are numbers greater than zero and satisfy an expression a/b=0.1 to 10.).

Examples of the metal species M in the chemical formula (1) include Na, K, Ca, Ti, Cr, Mn, Fe, Co, Ni, Cu, Zn and the like. These metal species may be contained alone or in combination. Of these, Ni, Co, and Zn are particularly preferable, and Zn is especially preferable, because they are excellent in an oxygen barrier property in the high humidity environment.

In the above chemical formula (1), examples of the anionic ligand A include RO (alkoxy ligand), RCOO (carboxylate ligand), $NO_3$, $SO_3$, $PO_4$, $BO_3$, F, Br, and Cl (wherein R is an alkyl chain which is generally represented by a chemical formula $C_m H_{2m+1}$ (m=1 to 20) and may have a functional group such as OH group as long as the effects of the present disclosure are not impaired). However, O (oxo ligand) is excluded as the anionic ligand A. These anionic ligands may be contained alone or in combination. From the viewpoint of interaction with EVOH, preferred are $NO_3$, Cl, RO, and RCOO, and particularly preferred is RCOO. Especially, $CH_3COO$ is preferred.

Note that the metal compound used in the present disclosure excludes general clay minerals such as, for example, gibbsite, kaolinite, illite/mica, smectite, vermiculite, chlorite, iron compounds, quartz, amorphous minerals, carbonate minerals and the like.

The metal compound used in the present disclosure may contain a water molecule, and its water content is usually 0.1 to 20 wt. %.

Specific examples of the metal compound include, for example, lamellar compounds containing Zn as the metal species. Of them, a Zn-containing lamellar compound represented by a chemical formula $[Zn_5(OH)_8(CH_3CO_2)_2 \cdot 2H_2O]$ is preferred, for the excellent oxygen barrier property in the high humidity environment.

The metal compound can be obtained, for example, by reacting a metal-containing material compound under specific conditions. Examples of the metal species contained in the metal-containing material compound include the metal species described for M in the chemical formula (1), and of them, Ni, Co, and Zn are preferable, and Zn is more preferable.

Examples of the metal-containing material compound include organic acid metal salts, inorganic metal salts and the like.

Organic acids constituting the organic acid metal salts include, for example, monovalent carboxylic acids such as acetic acid and the like, divalent carboxylic acids such as succinic acid, oxalic acid, tartaric acid, and the like, trivalent or higher carboxylic acids such as citric acid, ethylenediamine tetraacetic acid, and the like. These may be used alone or in combination. Further, the organic acid metal salt may be a hydrate or an anhydride.

As the organic acid metal salt, monovalent carboxylic acid metal salts are preferable, acetic acid metal salts are more preferable, zinc acetate and hydrates thereof are further preferable, because of an excellent oxygen barrier property in the high humidity environment.

Examples of the inorganic metal salt include metal fluorides, chlorides, bromides, iodides, and oxo acids. These may be used alone or in combination. Further, the inorganic metal salt may be a hydrate or an anhydride.

Metal chlorides and oxo acids are preferable, zinc chloride and zinc nitrate or hydrates thereof are particularly preferable, as the inorganic metal salts, from the viewpoint of an excellent oxygen barrier property in the high humidity environment.

The metal compound used in the present disclosure can be prepared with the use of the metal-containing material compound, for example, by a method (I) in which the metal-containing material compound is allowed to react in the presence of a base, or a method (II) in which the metal-containing material compound is allowed to react by heating.

These methods will hereinafter be described in detail.

[Method (I)]

The method (I) described above is a method in which the metal-containing material compound is allowed to react in the presence of a base.

Examples of the base used in the above method (I) include hydroxides of alkali metals or alkaline earth metals. Of these, alkali metal hydroxides are preferable, and sodium hydroxide is particularly preferable, because they are excellent in reactivity with the metal-containing material compound.

In the reaction between the metal-containing material compound and the base, usually, the metal-containing material compound and the base may be mixed and reacted in a solution.

The method for mixing the metal-containing material compound and the strong base is not particularly limited, and includes, for example, a method of mixing a solution in which the metal-containing material compound is dissolved and a solution in which the base is dissolved, and a method of mixing a slurry in which the metal-containing material compound is dispersed and a solution in which the base is dissolved. Among the above methods, a method of mixing a solution in which the metal-containing material compound is dissolved and a solution in which the base is dissolved is preferable from the viewpoint of reaction efficiency. Furthermore, when an organic acid metal salt is used as the metal-containing material compound, a method of adding and mixing a solution in which an organic acid metal salt is dissolved to a solution in which a base is dissolved is preferable, and when an inorganic metal salt is used, a method of adding and mixing a solution in which a base is dissolved to a solution in which an inorganic metal salt is dissolved is preferable.

The solvent for dissolving the metal-containing material compound and the base is not particularly limited as long as it can dissolve the metal-containing material compound and the base, and includes, for example, water, and lower alcohols having 1 to 5 carbon atoms such as methanol, ethanol, 1-propanol, 2-propanol, 1-butanol, 2-butanol and the like. These may be used alone or in combination. Of these, water is preferable from the standpoint of easy post treatment.

The concentration of the metal-containing material compound in the solution in which the metal-containing material compound is dissolved is usually 0.5 to 3 mol/L, preferably 1 to 2 mol/L.

The concentration of the base in the solution in which the base is dissolved in a solvent is usually 0.01 to 100 mol/L, preferably 0.1 to 30 mol/L, and particularly preferably 1 to 10 mol/L.

If the concentrations of the metal-containing material compound and the base are too lower than the above range, the reaction tends not to proceed sufficiently. Further, if the concentrations of the metal-containing material compound and the base are too higher than the above range, a side reaction tends to occur.

The molar ratio of the metal-containing material compound to the base (metal-containing material compound: base) is usually 0.5:2 to 2:0.5, preferably 0.8:1.5 to 1.5:0.8, particularly preferably 0.9:1.2 to 1:1. If the molar ratio is out of the above range, the reaction tends not to proceed sufficiently.

The pH at the time of reacting the metal-containing material compound with the base is usually 4 to 9, preferably 5 to 8. If the pH is too low below the above range, the reaction tends not to proceed sufficiently. Further, if the pH is too high than the above range, there is a tendency that the generated metal compound is decomposed. The pH is adjusted by the amounts of the solution in which the metal-containing material compound is dissolved or the slurry in which the metal-containing material compound is dispersed and the solution in which the base is dissolved.

The reaction temperature in the above reaction is usually 15 to 60° C., preferably 20 to 40° C. If the reaction temperature is too low, the reaction tends not to proceed sufficiently, and if the reaction temperature is too high, the metal-containing material compound tends to be decomposed by heat and the desired metal compound tends not to be obtained.

The reaction time is usually 0.5 to 5 hours, preferably 1 to 3 hours, and the pressure at the time of reaction may be normal pressure.

After the above reaction, a metal compound is obtained as a precipitate. The obtained metal compound may be used as it is, but it is preferable to purify the metal compound by washing, pulverizing or the like.

[Method (II)]

The method (II) described above is a method (II) in which the metal-containing material compound is allowed to react by heating.

The method (II) described above is usually carried out by heating a solution in which the metal-containing material compound is dissolved while stirring the solution.

As the solvent for dissolving the metal-containing material compound, the solvents listed in the method (I) above can be used. Of these, water and alcohols are preferable, and a mixed solvent of water and 1-propanol is particularly preferable.

As the heating conditions, the temperature of the solution is usually 20 to 100° C., preferably 50 to 95° C., particularly preferably 70 to 90° C. If the reaction temperature is too low, the reaction tends not to proceed sufficiently, and if the reaction temperature is too high, the metal-containing material compound tends to be decomposed by heat, and the desired metal compound tends not to be obtained.

The reaction time is usually 0.1 to 100 hours, preferably 0.5 to 30 hours, particularly preferably 1 to 10 hours, and the pressure at the time of reaction may be normal pressure.

After the above reaction, a metal compound is obtained as a precipitate. The obtained metal compound may be used as it is, or the metal compound may be purified by washing, pulverizing or the like.

The term "metal compound" generally means, for example, a metal salt, a metal oxide, a metal complex, a metal, an alloy or the like. In contrast, the metal compound prepared by any of the methods described above is a metal lamellar compound having a lamellar structure including the lamellar structural unit represented by the chemical formula (1) spaced at a specific interfacial distance from each other. Where molecules of EVOH and water molecules are present around the metal compound, therefore, the layers of the metal compound are separated from each other, and the resulting separated minute lamellar structural unit interacts with EVOH on a molecular basis. This supposedly ensures the excellent oxygen barrier property.

For the excellent gas barrier property, particularly for the excellent oxygen barrier property, in the high humidity environment, the metal compound of the present disclosure preferably has a major X-ray diffraction peak at $2\theta=2$ to $15°$, preferably $2\theta=2$ to $9°$, particularly preferably $2\theta=3$ to $8°$, in an X-ray diffraction pattern as measured by the wide angle X-ray diffraction using CuKα radiation. Where the metal compound has the major X-ray diffraction peak in the aforementioned range, the metal compound and EVOH interact with each other, so that the polarity of EVOH is increased. This ensures the excellent oxygen barrier property, in the high humidity environment.

The interlayer distance (distance between layers) of the metal compound is preferably 0.01 to 50 nm, more preferably 0.1 to 30 nm, from the viewpoint of interaction with EVOH molecules and water molecules. The interlayer distance of the metal compound can be calculated according to the equation of Bragg based on the diffraction position of the peak with the strongest intensity in the range of $2\theta=2$ to $15°$ when analyzed by X-ray diffraction method.

The molecular weight of the lamellar structural unit peeled from the metal compound is preferably 100 to 10,000, particularly preferably 200 to 2,000, from the viewpoint that interaction of EVOH is possible in a molecular level.

Further, the lamellar structural unit is preferably hydrophilic from the viewpoint of interaction with the molecule of EVOH.

Further, it is preferable that the lamellar structural unit does not decompose even if it is allowed to stand still for 1,000 hours in an environment of 20° C. and 90% RH.

The amount on metal basis of the metal compound in the EVOH resin composition is usually 0.01 to 10 parts by weight, preferably 0.05 to 8 parts by weight, particularly preferably 0.1 to 5 parts by weight, especially preferably 0.2 to 3 parts by weight, based on 100 parts by weight of EVOH. When the content of the metal compound is too small, there is a tendency that the oxygen barrier property in the high humidity environment is lowered, while when the content of the metal compound is too high, there is a tendency that whitening occurs and transparency lowers when formed into a film.

In the case where the EVOH resin composition contains multiple metal compounds of different metal species, the total content of all metal compounds contained in the EVOH resin composition is taken as the content.

The content of the metal compound can be determined by a standard addition method using ICP-MS.

[Other Components]

The EVOH resin composition of the present disclosure may contain blending agents generally blended in the EVOH resin composition, for example, heat stabilizers, antioxidants, antistatic agents, colorants, UV absorbers, lubricants, plasticizers, light stabilizers, surfactants, antibacterial agents, desiccants, antiblocking agents, flame retardants, cross-linking agents, hardeners, foaming agents, crystal nucleating agents, anti-fog agents, biodegradation additives, silane coupling agents, oxygen absorbers and the like, as long as the effect of the present disclosure is not impaired. These can be used alone or in combination.

The EVOH resin composition of the present disclosure can be obtained by mixing EVOH, a metal compound, and if necessary, other components.

<EVOH Resin Composition>

The EVOH resin composition of the present disclosure contains the EVOH, and a metal compound satisfying the following general formula (1).

$$M_a(OH)_b A^{n-}{}_{(2a-b)/n} \qquad (1)$$

(wherein M is a metal species, A is an anionic ligand having a valence of n– and excluding a hydroxy ligand and O (oxo ligand), n is an integer not less than 1, and a and b are numbers greater than zero and satisfy an expression a/b=0.1 to 10.).

It is guessed that the lamellar structure of the metal compound satisfying the general formula (1) described above and EVOH interact to increase the polarity of EVOH, leading to the effect of an excellent oxygen barrier property in the high humidity environment.

In the present disclosure, the resin composition preferably has the major peak at 2θ=2 to 15°, more preferably at 2θ=2 to 9°, particularly preferably at 2θ=3 to 8°, in the X-ray diffraction pattern as measured by the wide angle X-ray diffraction using CuKα radiation for the excellent gas barrier property, particularly for the excellent oxygen barrier property, in the high humidity environment.

The major peak appearing at 2θ=2 to 15° in the X-ray diffraction pattern as measured by the wide angle X-ray diffraction using CuKα radiation is preferably a peak attributable to the above general formula (1).

Note that the wide angle X-ray diffraction is measured under the following conditions.

[Measurement Conditions]

Apparatus: D8 DISCOVER (available from Bruker Japan Co., Ltd.)
Detector: Two-dimensional detector VANTEC-500 (available from Bruker Japan Co., Ltd.)
Voltage: 50 kV
Electric Current: 100 mA
Camera length: 100 mm
Measurement method: Reflection method
Integration period: 30 minutes
Wavelength: CuKα radiation (with Kα1 and Kα2 not separated)
Detector position: 2θ=10°
X-ray incident angle: θ=0.3°
Conditions for one-dimensional integration in 2θ direction: 2θ=0 to 35°, azimuthal angle (chi)=–95 to –85°
One-dimensional integration in azimuthal direction: azimuthal angle (chi)=–180 to 0°

The one-dimensional integration in the azimuthal direction is performed with a 1.0° range, so that a peak having the highest diffraction intensity appears at 2θ=2 to 15°. At this time, where a peak is observed in an azimuthal angle range of –180 to 0°, it is determined that a diffraction peak is observed at 2θ=2 to 15°. Where a diffraction peak is observed at 2θ=6.8°, for example, the one-dimensional integration in the azimuthal direction is performed for 2θ=6.0 to 7.0°. At this time, if a peak is observed in an azimuthal angle range of –180 to 0°, it may be determined that a diffraction peak is observed at 2θ=2 to 15°.

A film formed from the EVOH resin composition to be described later may be used as it is as a specimen for the wide angle X-ray diffraction. The EVOH resin composition film is often laminated as a resin composition layer on a base. If the EVOH resin composition layer can be separated from the base, the wide angle X-ray diffraction may be performed on the separated EVOH resin composition layer. If the resin composition layer cannot be separated from the base, the wide angle X-ray diffraction may be performed on the resin composition layer laminated on the base. For the wide angle X-ray diffraction, the thickness of the separated EVOH resin composition layer (film) is preferably not less than 30 μm. If the resin composition film has an insufficient thickness, a plurality of such resin composition films may be stacked to be formed into a laminate.

<Film Containing EVOH Resin Composition>

The film containing the EVOH resin composition of the present disclosure is obtained by forming a film of the composition containing the EVOH resin composition, and is preferably obtained by forming a film of the EVOH resin composition.

Exemplary film forming methods include a method using a solution (coating liquid) of the composition containing the EVOH resin composition, and a method in which pellets of the composition containing the EVOH resin composition of the present disclosure are melt-formed by means of an extruder. Particularly, the method using the solution (coating liquid) of the composition containing the EVOH resin composition is preferred. Where the coating liquid is to be used, the coating liquid typically has a solid concentration of 0.5 to 30 wt. %, preferably 5 to 20 wt. %.

Exemplary coating liquid preparation methods include a method in which all the ingredients are simultaneously fed to and mixed together in a solvent, and a method in which a solution is prepared by dissolving some of the ingredients in a solvent, and the other ingredients are added to and mixed with the solution. Particularly, a method in which a solution is prepared by dissolving EVOH in a solvent, and the other ingredients are added to and mixed with the solution is preferred for working efficiency.

In the metal compound preparation methods described above, EVOH is preferably dissolved in the solvent during the reaction of the metal-containing material compound. For the working efficiency, EVOH is preferably dissolved in the solvent in the metal compound preparation method (II).

Usable examples of the solvent include those described for the preparation of the metal compound.

As the film forming method, for example, known methods such as a melt extrusion method or a casting method and a method by coating, and the like can be adopted. Of these, the coating method is preferable.

Examples of the coating method include known methods such as bar coating, roll coating, die coating, gravure coating, comma coating, screen printing and the like.

After coating, a film composed of an EVOH resin composition can be obtained by, for example, drying at 60 to 105° C. for 0.5 to 10 minutes by a heat treatment or the like. Further, the film may be subjected to stretching operations such as uniaxial stretching and biaxial stretching, if necessary.

The film may be a single layer structure or a multilayer structure. Further, it is preferable that the multilayer structure has at least one layer formed of the above film. Further, the multilayer structure may be laminated with a film-formed film or may be laminated with another base resin.

The thickness of the film is usually 1 to 200 μm, preferably 1 to 100 μm, particularly preferably 1 to 50 μm. In the case where the film-formed film has a multilayer structure, the sum of the thicknesses of all films composed of the EVOH resin composition is taken as the thickness of the film.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrenes, vinyl ester resins, polyester elastomers, polyurethane elastomers, polystyrene elastomers, halogenated polyolefins such as chlorinated polyethylenes and chlorinated polypropylenes, and aromatic and aliphatic polyketones. These may be used alone or in combination. A base film formed of any of these base resins may be subjected to a surface treatment such as corona treatment.

The film containing the EVOH resin composition of the present disclosure has an excellent gas barrier property in the high humidity environment. The film is preferably allowed to stand still in the higher humidity environment, because the film can be imparted with a more excellent gas barrier property, particularly a more excellent oxygen barrier property, in the high humidity environment. There is no clear principle for this effect, but it is supposed that, by allowing the film to stand still in the higher humidity environment, the molecules of the EVOH are plasticized, and the metal-containing lamellar compound dispersed in the film interacts with the EVOH or is locally present in the surface of the film.

In the present disclosure, the higher humidity environment means an environment at 20±5° C. at 90±10% RH.

The period during which the film is allowed to stand still is typically not shorter than 70 hours, preferably not shorter than 300 hours, more preferably not shorter than 600 hours. The upper limit of the stand-still period is typically 1,000 hours.

The oxygen permeability of the film composed of the EVOH resin composition is preferably not greater than 15 cc·20 μm/m²·day·atm (cm³·20 μm/m²·day·atm), more preferably not greater than 10 cc·20 μm/m²·day·atm, particularly preferably not greater than 5 cc·20 μm/m²·day·atm. The oxygen permeability is measured in an environment of 20° C. and 90% RH, and the lower limit of the oxygen permeability is usually 0 cc·20 μm/m²·day·atm. Further, the oxygen permeability can be determined by an oxygen permeation rate measuring device.

The EVOH resin composition of the present disclosure and the film composed of the EVOH resin composition are useful for packaging materials, and can be advantageously used for packaging materials, particularly, for foods, pharmaceutical products, and the like.

EXAMPLES

The embodiments of the present disclosure will hereinafter be described more specifically by way of examples thereof. However, it should be understood that the present disclosure be not limited to the examples within the scope of the present disclosure. In the following examples, "parts" is based on weight.

Prior to the examples, the following EVOH was prepared.
[Hydrophilic Resin]
    EVOH1 (content of ethylene structural unit: 25 mol %, MFR: 4 g/10 min, saponification degree: 99.6 mol %, moisture content: 0.3 wt. %)
A metal compound was synthesized in the following manner.
<Synthesis of Zn-containing Lamellar Compound>
A Zn-containing lamellar compound was synthesized by a method described in Inorg. Chem. 2013, 52, 95-102.

Specifically, 900 parts of a 1.5 mol/L sodium hydroxide aqueous solution was stirred at 27° C., and 900 parts of a 1.5 mol/L aqueous solution of zinc acetate dihydrate (available from Fujifilm Wako Pure Chemical Corporation) was added to the sodium hydroxide aqueous solution. Then, a reaction was allowed to proceed at 27° C. for two hours with stirring. After the reaction, a deposited white precipitate was filtered by a vacuum filtration method. Thereafter, the resulting white solid substance was stirred in 750 parts of water, and again filtered for washing thereof. This washing operation was performed a total of three times by changing water. The white solid substance finally filtered out was dried at 60° C. at an ordinary pressure over night, whereby a Zn-containing lamellar compound was prepared.
<Identification of Synthesized Zn-Containing Lamellar Compound>
The resulting substance was identified as the Zn-containing lamellar compound by the solid-state NMR and the wide angle X-ray diffraction.
[Solid-State NMR ($^{13}$C-CP/MAS) Measurement]
A 4-mm φ zirconia rotor was filled with the Zn-containing lamellar compound, and tightly capped with a polyethylene drive chip, whereby a measurement sample was prepared. The measurement sample was analyzed with a CP/MAS probe by means of a solid-state NMR apparatus (AVANCE III 400WB ($^{1}$H at 400 MHz and $^{13}$C at 100 MHz) available from Bruker Japan Co., Ltd.)

After the rotor was rotated at 5,000 Hz, the NMR analysis was performed with a 90-degree pulse width of 45 µs, a contact time of 2 ms, a cumulative number of 485, a sampling period of 50 ms, and a delay period of 5 sec.

[Wide Angle X-Ray Diffraction (XRD) Measurement]

The Zn-containing lamellar compound was analyzed by the wide angle X-ray diffraction (XRD) measurement under the following conditions.

[Measurement Conditions]
Apparatus: D8 DISCOVER (available from Bruker Japan Co., Ltd.)
Voltage: 50 kV
Electric current: 100 mA
Camera length: 150 mm
Measurement method: Reflection method
Integration period: 20 minutes As a result of the measurement, major peaks were detected at $2\theta=6.8°$, $13.5°$, and $20.2°$.

Based on the measurement results of the solid-state NMR and the wide angle X-ray diffraction, the Zn-containing lamellar compound was identified as $Zn_5(OH)_8(CH_3CO_2)_2 \cdot 2H_2O$ with reference to Inorg. Chem. 2013, 52, 95-102.

Based on the diffraction position of a highest-intensity peak observed at $2\theta=6.8°$ when the Zn-containing lamellar compound $(Zn_5(OH)_8(CH_3CO_2)_2 \cdot 2H_2O)$ was analyzed by the wide angle X-ray diffraction, the interlayer distance of the Zn-containing lamellar compound was calculated from the Bragg equation. As a result, it was confirmed that the Zn-containing lamellar compound $(Zn_5(OH)_8(CH_3CO_2)_2 \cdot 2H_2O)$ had an interlayer distance of 1.3 nm.

Example 1

First, 5 parts of EVOH1 was added to 45 parts of a water/1-propanol=1/1 (volume ratio) mixed solvent, and completely dissolved in the solvent with heating to 87° C. with stirring for one hour. The resulting solution was left to cool to 55° C., and then the Zn-containing lamellar compound prepared in the aforementioned manner was added in an amount of 0.05 parts on metal basis based on 100 parts of the EVOH. The resulting mixture was stirred still at 55° C. for two hours, whereby an EVOH resin composition (coating liquid) was prepared. The coating liquid thus prepared was applied on a corona-treated surface of a corona-treated PET substrate having a thickness of 12 µm with the use of a wire bar #24, and then dried at 80° C. for five minutes. Thus, a double layer film including a 6-µm thick film layer of the resin composition laminated on the PET substrate was produced. The resulting film was allowed to keep still under a humidity condition at 20° C. at 90% RH for 600 hours. Thus, a film of Example 1 was produced.

Example 2

A film was produced in the same manner as in Example 1, except that the Zn-containing lamellar compound was added in an amount of 0.1 parts on metal basis based on 100 parts of EVOH. The film was subjected to the same humidity condition as in Example 1.

Example 3

A film was produced in the same manner as in Example 1, except that the Zn-containing lamellar compound was added in an amount of 1.0 part on metal basis based on 100 parts of EVOH. The film was subjected to the same humidity condition as in Example 1.

Example 4

A film was produced in the same manner as in Example 1, except that the Zn-containing lamellar compound was added in an amount of 5.0 parts on metal basis based on 100 parts of EVOH. The film was subjected to the same humidity condition as in Example 1.

Comparative Example 1

A film was produced in the same manner as in Example 1, except that the Zn-containing lamellar compound was not added. The film was subjected to the same humidity condition as in Example 1.

Comparative Example 2

A film was produced in the same manner as in Example 1, except that zinc oxide (available from Fujifilm Wako Pure Chemical Corporation) was added in an amount of 0.1 parts on metal basis based on 100 parts of EVOH instead of the Zn-containing lamellar compound. The film was subjected to the same humidity condition as in Example 1.

Using the films of Examples 1 to 4 and Comparative Examples 1 and 2 obtained above, wide angle X-ray diffraction and an oxygen barrier property were measured under the following conditions. The results are shown in Table 1 below.

[Wide Angle X-Ray Diffraction (XRD) Measurement of Films]

The EVOH resin composition film obtained above was separated from the PET film and laminated so as to have a thickness of not less than 30 µm to prepare a sample.

Measurement of wide angle X-ray diffraction of this sample was performed under the following conditions.

[Measurement Conditions]
Apparats: D8 DISCOVER (available from Bruker Japan Co., Ltd.)
Detector: Two-dimensional detector VANTEC-500 (available from Bruker Japan Co., Ltd.)
Voltage: 50 kV
Electric Current: 100 mA
Camera length: 100 mm
Measurement method: reflection method
Integration period: 30 minutes
Wavelength: CuKα radiation (with Kα1 and Kα2 not separated)
Detector position: $2\theta=10°$
X-ray incident angle: $\theta=0.3°$
Conditions for one-dimensional integration in 2θ direction: $2\theta=0$ to $35°$, azimuthal angle (chi)=$-95$ to $-85°$
One-dimensional integration in azimuthal direction: $2\theta=6.0$ to $7.0°$, azimuthal angle (chi)=$-180$ to $0°$ After the X-ray diffraction measurement, the resulting diffraction pattern in an azimuthal angle range of $-180$ to $0°$ was azimuthally integrated into a one-dimensional diffraction pattern in a range of $2\theta=6.0$ to $7.0°$ for confirmation of the azimuthal dependence of the diffraction intensity. At this time, where a diffraction peak was observed at an azimuthal angle of $-90°$, it was determined that the EVOH resin composition had a diffraction peak at $2\theta=6.0$ to $7.0°$.

[Gas Barrier Property]

The oxygen permeability of the resulting EVOH resin composition film was measured at 20° C. at 90% RH by means of an oxygen permeability measurement apparatus (OX-TRAN100A available from MOCON Corporation).

TABLE 1

| | EVOH | Metal compound type | Amount on metal basis *[1] (parts) | Film humidity control time (hrs) | X-ray diffraction 2θ | Gas barrier property (cc ·20 μm/ m²·day·atm) |
|---|---|---|---|---|---|---|
| Example 1 | EVOH1 | $Zn_5(OH)_8(CH_3CO_2)_2(H_2O)_2$ | 0.05 | 600 | Peak observed at 6.0 to 7.0° | 11.7 |
| Example 2 | EVOH1 | $Zn_5(OH)_8(CH_3CO_2)_2(H_2O)_2$ | 0.1 | 600 | Peak observed at 6.0 to 7.0° | 2.0 |
| Example 3 | EVOH1 | $Zn_5(OH)_8(CH_3CO_2)_2(H_2O)_2$ | 1.0 | 600 | Peak observed at 6.0 to 7.0° | 1.9 |
| Example 4 | EVOH1 | $Zn_5(OH)_8(CH_3CO_2)_2(H_2O)_2$ | 5.0 | 600 | Peak observed at 6.0 to 7.0° | 12.7 |
| Comparative Example 1 | EVOH1 | — | — | 600 | none | 15.2 |
| Comparative Example 2 | EVOH1 | ZnO | 0.1 | 600 | none | 24.8 |

*[1] Amount based on 100 parts of EVOH

As can be seen from Table 1 above, the resin compositions of Examples 1 to 4 containing EVOH and a metal compound satisfying the general formula (1) had an excellent gas barrier property in the high humidity environment.

On the other hand, the EVOH resin composition of Comparative Example 1 and the EVOH resin composition of Comparative Example 2 which did not contain a metal compound satisfying the general formula (1) were all inferior in a gas barrier property.

Although the specific embodiments of the present disclosure have been shown in the above examples, the above examples are merely examples and are not to be construed in a limited manner. Various variations apparent to those skilled in the art are intended to be within the scope of the present disclosure.

The EVOH resin compositions of the present disclosure are excellent in gas barrier property, particularly in oxygen barrier property, in the high humidity environment. Therefore, the resin compositions of the present disclosure are useful for packaging materials, and can be advantageously used for packaging materials, particularly, for foods, pharmaceutical products, and the like.

The invention claimed is:

1. An ethylene-vinyl alcohol copolymer resin composition, comprising:
   an ethylene-vinyl alcohol copolymer; and
   a metal compound;
   wherein the metal compound satisfies the following general formula (1):

$$M_a(OH)_b A^{n-}{}_{(2a-b)/n} \quad (1)$$

wherein:
   M is a metal species,
   A is an anionic ligand selected from at least one of the group consisting of RO, RCOO, $SO_3$, $PO_4$, $BO_3$, F, Br, and Cl; where R is an alkyl chain having chemical formula $C_m H_{2m+1}$, and m is 1 to 20, wherein the alkyl chain may have a functional group;
   n is an integer not less than 1, and
   a and b are each a number greater than zero and satisfy an expression a/b=0.1 to 10.

2. The ethylene-vinyl alcohol copolymer resin composition according to claim 1, wherein the metal compound is present in an amount of 0.01 to 10 parts by weight on a metal basis based on 100 parts by weight of the ethylene-vinyl alcohol copolymer.

3. A film comprising the ethylene-vinyl alcohol copolymer resin composition according to claim 1.

4. The film according to claim 3, which has an oxygen permeability of not greater than 15 cc·20 μm/m²·day·atm at 20° C. at 90% RH.

5. A multilayer structure having at least one layer comprising the film according to claim 3.

6. The ethylene-vinyl alcohol copolymer resin composition according to claim 1, wherein anionic ligand A is at least one selected from the group consisting of RO, and RCOO.

* * * * *